(12) United States Patent
Weisman

(10) Patent No.: US 7,478,563 B2
(45) Date of Patent: Jan. 20, 2009

(54) APPARATUS AND METHOD TO MEASURE CABLE TENSION

(76) Inventor: Simon Weisman, 35 Timberlane Dr., Toronto, Ontario (CA) M3H 1J3

( * ) Notice: Subject to any disclaimer, the term of this patent is extended or adjusted under 35 U.S.C. 154(b) by 177 days.

(21) Appl. No.: 11/474,053

(22) Filed: Jun. 23, 2006

(65) Prior Publication Data
US 2007/0022675 A1 Feb. 1, 2007

Related U.S. Application Data

(60) Provisional application No. 60/693,420, filed on Jun. 24, 2005.

(51) Int. Cl.
G01N 3/00 (2006.01)
G01N 3/02 (2006.01)
G01M 5/00 (2006.01)
G01L 5/10 (2006.01)

(52) U.S. Cl. ............... 73/831; 73/860; 73/833; 73/786; 73/862.41

(58) Field of Classification Search ............ 73/860, 73/826, 831, 833, 856, 786, 862.391, 862.41
See application file for complete search history.

(56) References Cited

U.S. PATENT DOCUMENTS

| | | | | |
|---|---|---|---|---|
| 2,618,970 A | * | 11/1952 | Hitchcock et al. | 73/862.41 |
| 3,540,271 A | | 11/1970 | Hoff | |
| 4,158,962 A | | 6/1979 | Conoval | |
| 4,565,099 A | | 1/1986 | Arnold | |
| 5,435,185 A | * | 7/1995 | Eagan | 73/587 |
| 5,454,272 A | * | 10/1995 | Miller et al. | 73/862.41 |
| 5,731,528 A | * | 3/1998 | Yamazaki et al. | 73/862.41 |
| 5,750,894 A | * | 5/1998 | Russell et al. | 73/581 |
| 7,054,596 B2 | * | 5/2006 | Arntz | 455/66.1 |

* cited by examiner

Primary Examiner—Edward Lefkowitz
Assistant Examiner—Jonathan Dunlap
(74) Attorney, Agent, or Firm—Edmonds PC

(57) ABSTRACT

A method and apparatus for measuring tension in a stressed cable wherein the apparatus comprises two clamps, a circuit board and a power source. A transverse acceleration is generated in the stressed cable which is measured by an accelerometer in the apparatus, converted into an analog signal and transmitted to a portable computer programmed with software to calculate the cable tension from the fundamental period of vibration.

20 Claims, 4 Drawing Sheets

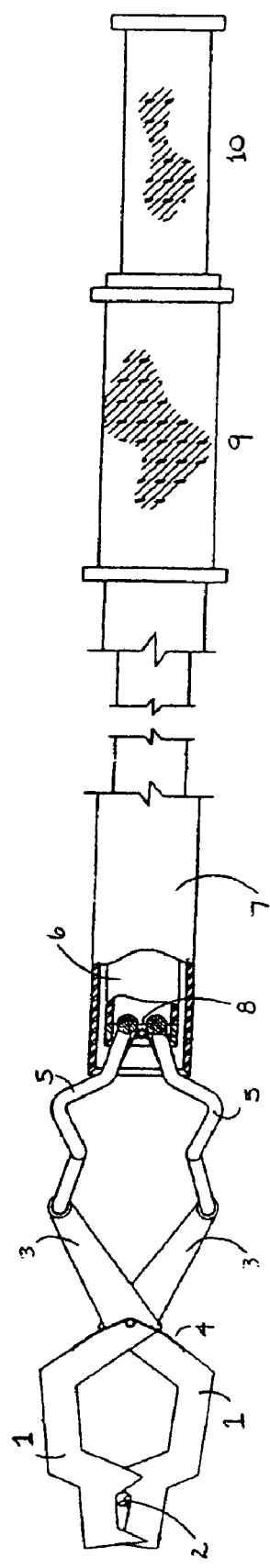
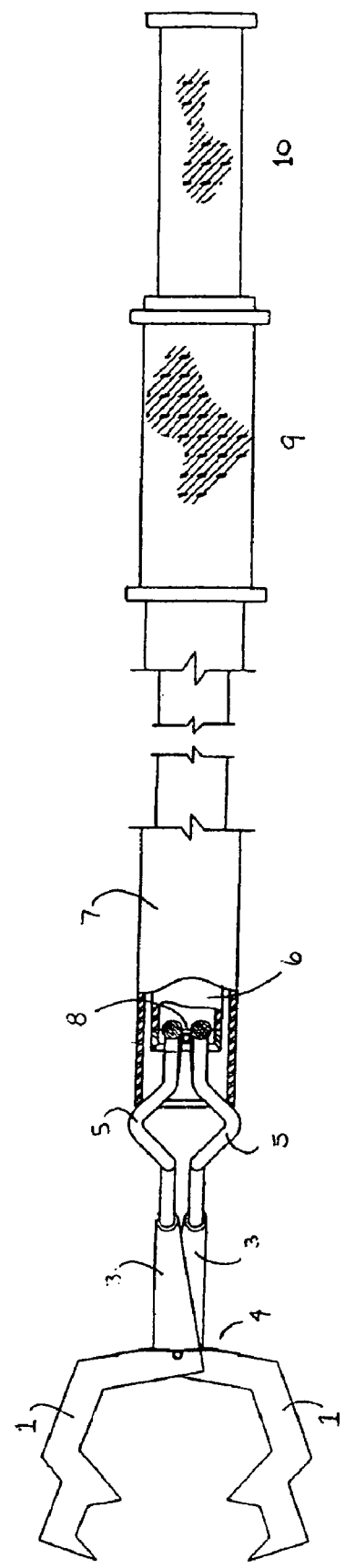
FIG.1A
FIG.1B

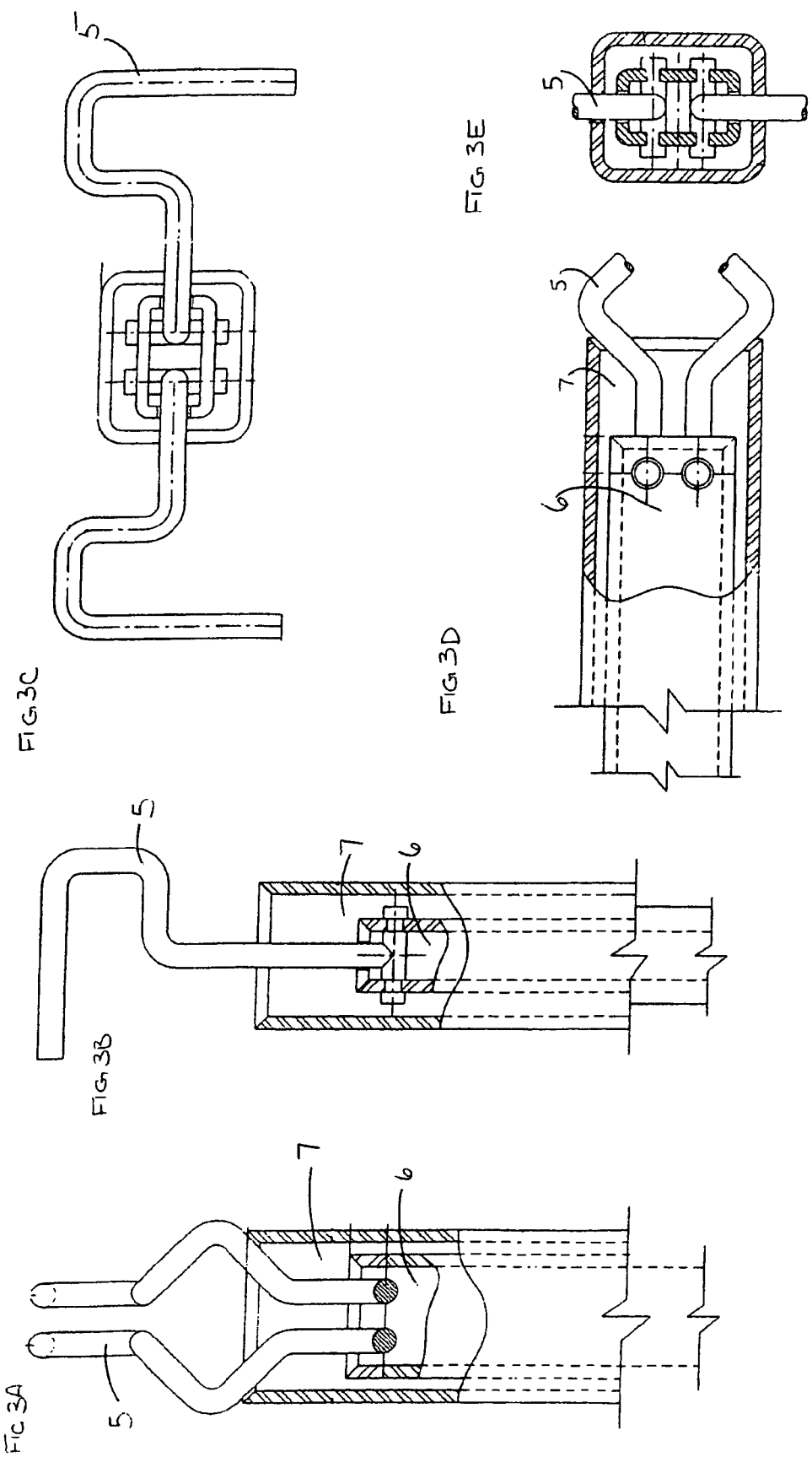

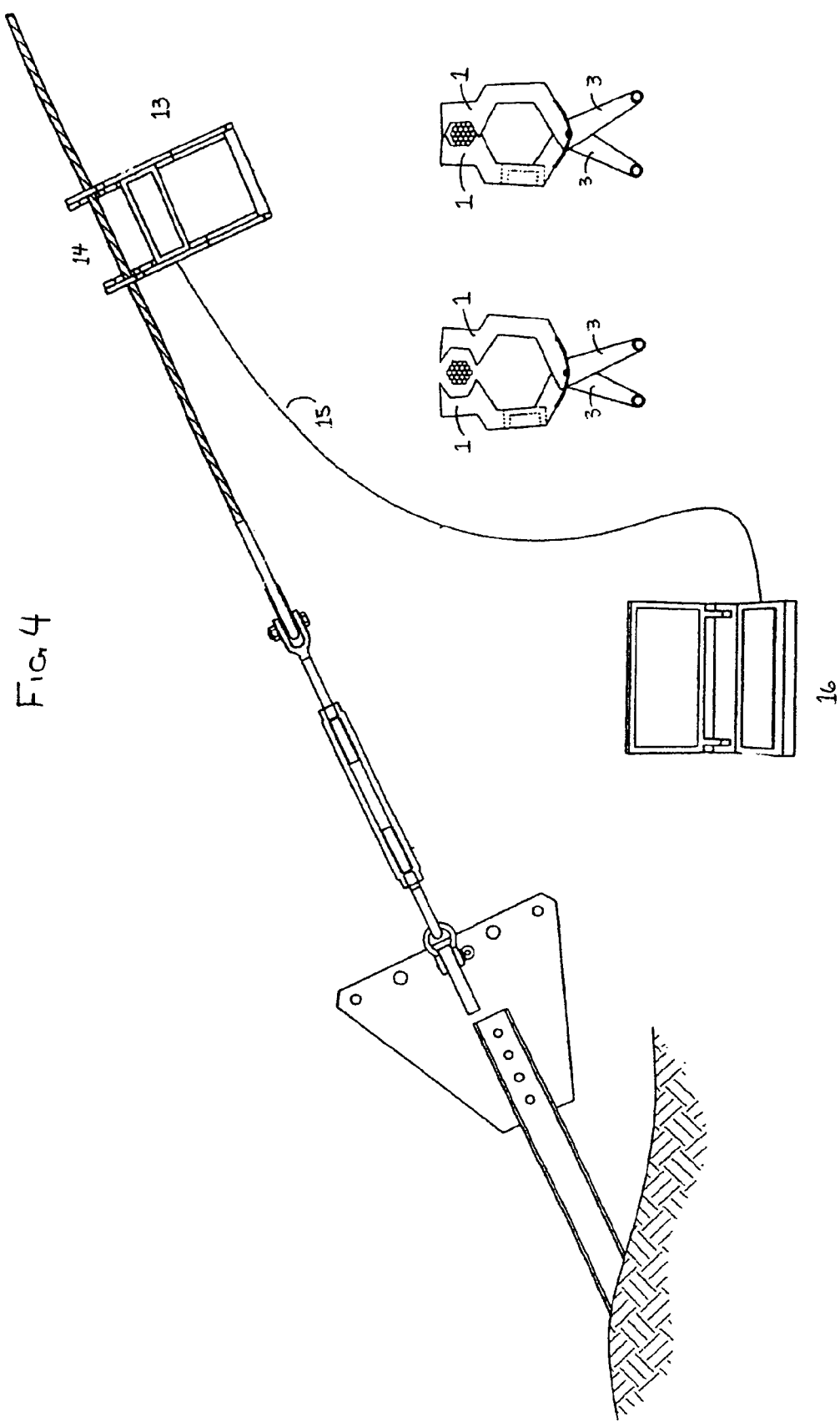

APPARATUS AND METHOD TO MEASURE CABLE TENSION

CROSS REFERENCE TO RELATED APPLICATION

This application claims the benefit under 35 USC §119(e) of U.S. Provisional Application having Ser. No. 60/693,420 filed on Jun. 24, 2005, which is incorporated by reference herein.

FIELD OF THE INVENTION

The present invention relates to an apparatus and method for measuring the tension in a stressed cable, wire, rope, guy wire, or similar material.

BACKGROUND OF THE INVENTION

In the communications tower industry, guyed towers are supported by one or more levels of braided or stranded high-strength steel guy cables that anchor the structure to the ground. Maintenance of guyed towers requires the guy cables to be inspected for proper tension. Proper tension ensures that the tower is correctly supported and that there is minimal deflection of antennas caused by twisting of the tower.

It is often necessary to ascertain the tension value of stressed cables in a quick, reliable manner without permanent attachment of the measuring device thereto.

Devices for measuring tension in a given length of stressed cable are known in the art. Such devices are used to determine tension in stressed cables by measuring the fundamental frequency or vibration thereof and utilizing this value to represent cable tension (U.S. Pat. No. 3,540,271).

Another prior art device (U.S. Pat. No. 4,158,962) provides a method and apparatus for measuring tension in a cable which involves affixing a small permanent magnet to the cable, imparting a disturbance to the cable thereby causing the cable and the magnet to vibrate, then detecting the frequency of alternating current or magnetic field perturbation caused by vibrations. An electrical signal is generated by sensing the fluctuating field of the permanent magnet attached to the vibrating cable and generating from this signal a periodic pulse signal having an average level proportional to the square of the cable variation frequency. The resulting signal is scaled to produce a final signal which is directly proportional to cable tension.

Another prior art device (U.S. Pat. No. 4,565,099) measures the tension in a suspended cable or similar material, wherein the tension is derived from sensor signals corresponding to the fundamental frequency of vibration in the cable. Such a device measures tension from sensors located at or near the terminal end point of a span of cable.

Prior art devices for measuring tension in a given length of stressed cable are bulky, cumbersome, expensive, and difficult to maintain because the instrumentation and meter used for measuring the tension of a stressed cable are attached to the tension measuring device by connecting wires. Such devices are difficult to use in inclement weather and require weather proofing for each individual component. In addition, such devices are not well-suited for use in the industry as they are not easily portable.

The term "cable", as used herein, includes rope, wire, chain, line, strand, lead, filament, or cord, in braided, coiled, single or multiple strands, or any similar structure which essentially functions in the same manner as a cable.

SUMMARY OF THE INVENTION

The invention described herein provides an apparatus and method for measuring the tension in a stressed cable.

It is an object of this invention to provide a tension measuring device which is compact in size and portable, battery powered and operative while being hand held. Another object of this invention is to provide a tension measuring device that can be operated without additional instrumentation attached, making it suitable for working on-site, especially for cable tension testing and measuring applications.

It is also desirable to have a tension measuring device which enables users to analyze the collected data on-site or, if desired, to store the data for later use and verification. Storage of data for later use enables users to read the results conveniently from a safe distance. Preferably, such a tension measuring device incorporates portability, without compromising the function of the equipment.

The apparatus and method of the present invention utilizes specialized clamps that allow for quick clamping and release of the apparatus during use. A portable computer can be attached to the apparatus using a data cable. The clamps comprise a circuit board and a battery to operate the apparatus. The circuit board contains an accelerometer for measuring transverse acceleration of the cable, and a circuit for converting transverse accelerations of the cable into an analog signal based on variations in voltage.

The analog signal can be automatically transmitted to and stored on a portable computer and in a data base for later use and for the preparation of a comprehensive report. The signal is analyzed by software that calculates the fundamental period of vibration from this data. From the fundamental period of vibration, the cable tension is calculated. The data generated by the apparatus includes the original analog signal displayed as a waveform which can be viewed by the user of the apparatus, and the recipient of the data base, in order to verify, if required, the suitability of the data.

The fundamental period of vibration of a length of accelerating cable can be used to calculate cable tension using the formula $T=4*W*L/g/P/P$, where:

T=the average cable tension;
g=the acceleration due to gravity;
W=the total weight of the cable;
L=the length of the cable;
P=the fundamental period of vibration of the cable.

Accordingly, the tension measuring apparatus of the present invention has the advantage of compact size and avoids the need for permanent attachment of additional instrumentation and meters to measure the tension of a stressed cable.

It is an aspect of the present invention to provide a portable apparatus for measuring the tension of a stressed cable comprising:

a) two clamps for attachment of the apparatus to the stressed cable;
b) a circuit in communication with the clamps containing an accelerometer for measuring the transverse acceleration of the cable;
c) a converter for converting transverse acceleration of the cable into an analog signal defined by variations in voltage output;
d) a means for storing the analog signal on a computer; and
e) software for calculating the tension of the cable from the analog signal.

It is another aspect of the present invention to provide a portable apparatus for measuring the tension of a stressed cable comprising clamps for attachment of the apparatus to the stressed cable and having the elements (b) and (c) above contained within a housing in communication with the clamps.

In a preferred embodiment of the apparatus, the fundamental period of vibration of the cable is derived from the analog signal using the software. The software is preferably adapted to solve the equation $T=4*W*L/g/P/P$, as defined above.

In another preferred embodiment of the apparatus, the proximal ends of the clamping members, when in a closed position, define a first interior space sized to receive a stressed cable which has a diameter of up to 20 mm and a second interior space sized to receive a stressed cable which has a diameter of up to 75 mm in diameter. The clamps preferably further comprise a first torsion spring for use in opening and closing the clamping members. A battery is preferably located in the clamp to power the apparatus.

In a preferred embodiment of the apparatus, the converter for converting transverse accelerations of the cable into an analog signal defined by variations in voltage is located in the clamp. The analog signal and data derived from the analog signal are preferably transmitted to and stored in a computer remote from the apparatus.

According to another aspect of the present invention, a method for measuring the tension of a stressed cable is provided. The method comprises the steps of:
 a) attaching the apparatus to the stressed cable by a clamp;
 b) generating transverse acceleration of the cable;
 c) measuring the transverse acceleration of the cable;
 d) converting the transverse acceleration of the cable into an analog signal defined by variations in voltage;
 e) storing the analog signal on a computer; and
 f) calculating the value of the tension of the cable from the analog signal.

In a further embodiment of the method, the fundamental period of vibration is derived from the analog signal using software. The step of calculating the value of the tension of the cable from the analog signal preferably comprises deriving a solution to the equation $T=4*W*L/g/P/P$ as defined above.

In a further embodiment of the method, the analog signal is preferably stored as data in a computer remote from the apparatus.

The foregoing are examples of certain aspects of the present invention. Many other embodiments are possible and will become apparent to those skilled in the art from a review of the description of certain embodiments of the present invention.

BRIEF DESCRIPTION OF THE FIGURES

FIG. 1A is a top view of the present invention, namely a portable clamp for use in measuring the tension of a stressed cable, in the closed position.

FIG. 1B is a top view of the present invention, namely a portable clamp for use in measuring the tension of a stressed cable, in the open position.

FIG. 3A is a top view of the extension handle claw members of the present invention.

FIG. 3B is a side view of the extension handle claw members of the present invention.

FIG. 3C is a front view of the extension handle claw members of the present invention in open position.

FIG. 3D is a bottom view of the extension handle claw members of the present invention.

FIG. 3E is a front view of the extension handle showing the round bar of the claw members of the present invention.

FIG. 4 is a diagram setting out the method of measuring the tension of a stressed cable with the portable apparatus of the present invention.

DETAILED DESCRIPTION

Figure 2B:
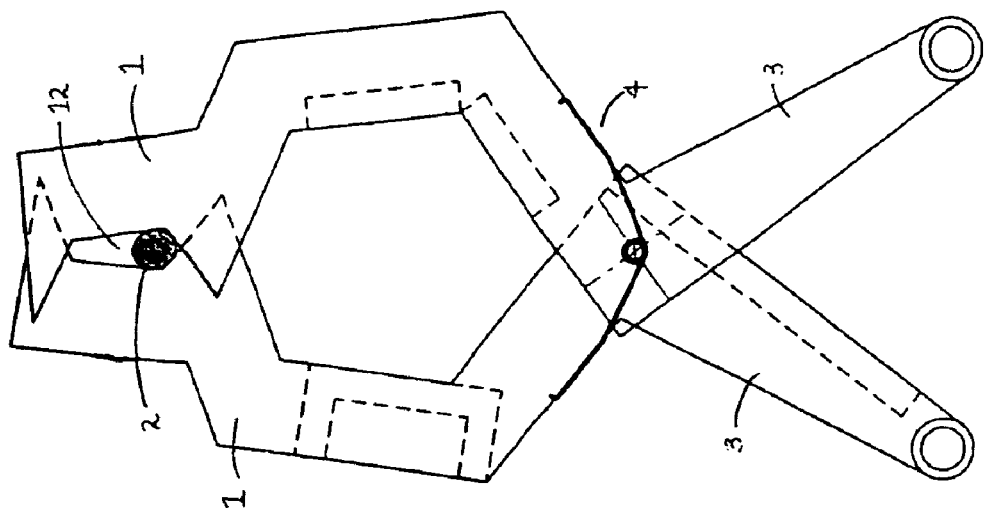
FIG. 2B is a top view of the clamping members of the present invention in the closed position, receiving a 20 mm cable.

Referring to FIGS. 1A and 1B, there is illustrated the clamps in which the two clamping members 1, used to attach the clamp to a stressed cable 2, are pivotally controlled in open and closed positions by a first torsion spring 4 and the distal ends of the clamping members 3. The distal ends of the clamping members 3 are fixed and supported by claw members 5 which are, in turn, supported and attached to a first tube member 6. The distal ends of the claw members 5 are connected to the first tube member 6 and are controlled in the open and closed positions by a second torsion spring 8. The telescoping tube members 7 comprise hand grips 9 and 10.

Figure 2A:
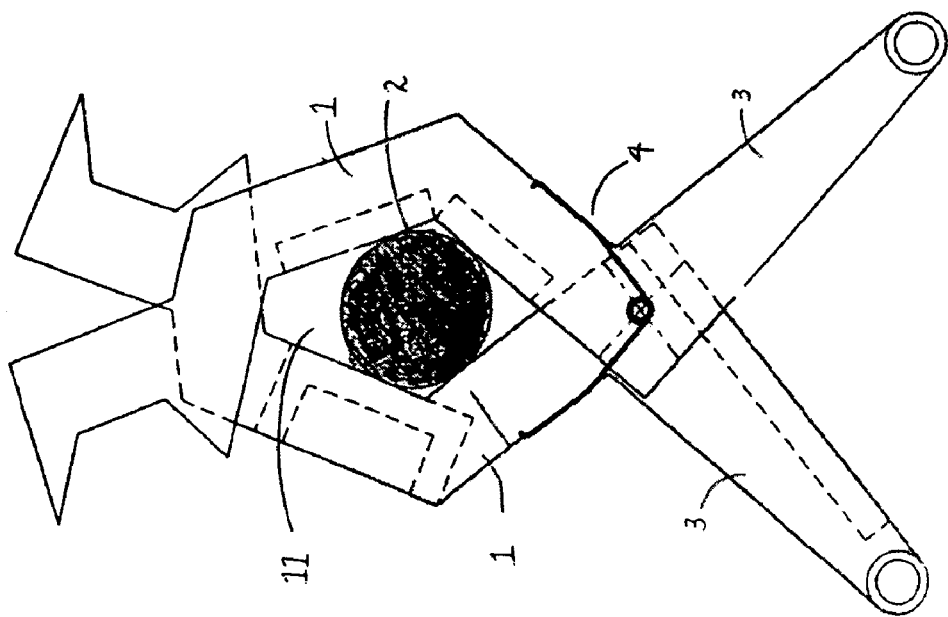
FIG. 2A is a top view of the clamping members of the present invention in the closed position, receiving a 75 mm cable.

Referring to FIGS. 2A and 2B, the clamping members 1, when in a closed position, define a first interior space 11 sized to receive a cable 2 of up to 75 mm in diameter. The clamping members 1 also define a second interior space 12 sized to receive a cable 2 of up to 20 mm in diameter.

Referring to FIGS. 3A to 3E, the details of the claw members 5 are provided. The distal ends of the claw members 5 are supported and connected to a first tube member 6 and are controlled in the open and closed positions by a second torsion spring 8 (not shown) and actuated by the telescoping tube member 7. The proximal ends of the claw members 5 are connected to the distal ends of the clamping members 1 (not shown).

Referring to FIG. 4, the method for operating the portable apparatus 13 of the present invention is depicted. A portable computer 16 is connected to the portable apparatus 13 using a data cable 15. The clamping members 1 are set in the open position by pulling together the distal ends of the clamping members 3. The clamping members 1 in the open position are placed around a length of cable 14 and the distal ends of the clamping members 3 are released to set the clamping members 1 in the closed position. The length of cable 14 is caused to vibrate by the operator of the portable apparatus in order to initiate recording of the transverse acceleration of the cable. Once the transverse acceleration has been recorded, the clamping members 1 are set in the open position by pulling together the distal ends of the clamping members 3. The clamping members 1 in the open position are removed from the length of cable 14 and the distal ends of the clamping members 3 are released to set the clamping members 1 in the closed position. Data collected by the portable apparatus 13 will be stored automatically in the portable computer 16 which will display the pulses and tensions.

The foregoing is considered as illustrative only of the principles of the invention. Further, since numerous modifications and changes will readily occur to those skilled in the art, it is not desired to limit the invention to the exact configurations, components, materials and applications shown and described, and accordingly, all suitable modifications and equivalents may be resorted to, falling within the scope of the invention.

The invention claimed is:

1. A portable apparatus for use with a portable computer in measuring the tension of a stressed cable, the apparatus comprising:
   a. two clamps, wherein each clamp comprises two clamping members pivotally joined and capable of being actuated into an open and closed position by a distal actuator, the pivot further comprising a first torsion spring biased to retain the clamping members in a closed position except when the distal actuator is actuated, and the proximal ends of the two clamping members, when in the closed position, defining at least one interior space sized to receive the stressed cable;
   b. a circuit board connected to the clamps and comprising:
      i. an accelerometer for measuring the transverse acceleration of the stressed cable;
      ii. a converter for receiving the transverse acceleration data of the stressed cable and converting it into an analog signal based on variations in voltage; and
      iii. a circuit that receives the analog signal from the converter and is capable of transmitting said analog signal; and
   c. a portable power source, such as a battery or a photo cell.

2. The portable apparatus of claim 1 wherein the circuit board is contained within a housing.

3. The portable apparatus of claim 1 wherein the analog signal is transmitted to a portable computer, the portable computer programmed with software to receive and analyze the analog signal.

4. The portable apparatus of claim 3, wherein the software, in analyzing the analog signal, derives a solution to the equation $T=4*W*L/g/P/P$ where:
   T is the average cable tension;
   g is the acceleration due to gravity;
   W is the total weight of the cable;
   L is the length of the cable; and
   P is the fundamental period of vibration of the cable.

5. The portable apparatus of claim 1 wherein the distal actuator comprises the distal ends of the clamping members.

6. The portable apparatus of claim 5 wherein pulling the distal ends of the clamping members together will actuate the clamping members.

7. The portable apparatus of claim 1 wherein one of the at least one interior spaces is sized to receive a cable having a diameter of up to 20 mm.

8. The portable apparatus of claim 1 wherein one of the at least one interior spaces is sized to receive a cable having a diameter of up to 75 mm.

9. A method for measuring the tension of a stressed cable comprising:
   a. attaching a portable apparatus to the stressed cable, the apparatus comprising:
      two clamps, wherein each clamp comprises two clamping members pivotally joined and capable of being actuated into an open and closed position by a distal actuator, the pivot further comprising a first torsion spring biased to retain the clamping members in a closed position except when the distal actuator is actuated, and the proximal ends of the two clamping members, when in the closed position, defining at least one interior space sized to receive the stressed cable;
      a circuit board connected to the clamps and comprising:
         an accelerometer for measuring the transverse acceleration of the stressed cable;
         a converter for receiving the transverse acceleration data of the stressed cable and converting it into an analog signal based on variations in voltage; and
         a circuit that receives the analog signal from the converter and is capable of transmitting said analog signal; and
      a portable power source, such as a battery or a photo cell;
   b. generating transverse acceleration of the stressed cable;
   c. sensing and recording the transverse acceleration of the stressed cable;
   d. converting the transverse acceleration of the stressed cable into an analog signal defined by variations in voltage output;
   e. transmitting the analog signal to a portable computer, said portable computer programmed with software to receive, analyze and store the analog signal; and
   f. calculating the value of the tension of the stressed cable from the analog signal.

10. The method of claim 9 wherein the step of calculating the value of the tension of the stressed cable comprises deriving a solution to the equation $T=4*W*L/g/P/P$ where:
    T is the average cable tension;
    g is the acceleration due to gravity;
    W is the total weight of the cable;
    L is the length of the cable; and
    P is the fundamental period of vibration of the cable.

11. The method of claim 9, wherein the circuit board is disposed within a housing.

12. The method of claim 9, wherein the circuit board is disposed within a housing, and wherein the housing is disposed between the two clamps.

13. A portable apparatus for use with a portable computer in measuring the tension of a stressed cable, the apparatus comprising:
    a. two clamps, wherein each clamp comprises two clamping members pivotally joined and capable of being actuated into an open and closed position by a distal actuator, the pivot further comprising a first torsion spring biased to retain the clamping members in a closed position except when the distal actuator is actuated, and the proximal ends of the two clamping members, when in the closed position, defining at least one interior space sized to receive the stressed cable;
    b. a circuit board contained within a housing and connected to the clamps and comprising:
       i. an accelerometer for measuring the transverse acceleration of the stressed cable;
       ii. a converter for receiving the transverse acceleration data of the stressed cable and converting it into an analog signal based on variations in voltage; and
       iii. a circuit that receives the analog signal from the converter and is capable of transmitting said analog signal; and
       wherein the housing is located between the two clamps; and
    c. a portable power source, such as a battery or a photo cell.

14. The portable apparatus of claim 13, wherein the analog signal is transmitted to a portable computer, the portable computer programmed with software to receive and analyze the analog signal.

15. The portable apparatus of claim 14, wherein the software, in analyzing the analog signal, derives a solution to the equation $T=4*W*L/g/P/P$ where:
    T is the average cable tension;
    g is the acceleration due to gravity;
    W is the total weight of the cable;

L is the length of the cable; and

P is the fundamental period of vibration of the cable.

16. The portable apparatus of claim 13, wherein the distal actuator comprises the distal ends of the clamping members.

17. The portable apparatus of claim 16, wherein pulling the distal ends of the clamping members together will actuate the clamping members.

18. The portable apparatus of claim 17, wherein the distal actuator further comprises an extension handle comprising:
   a. two claw members, wherein the proximal ends of the claw members are connected to the distal ends of each of the clamping members; and
   b. a plurality of telescoping tube members, wherein the distal ends of the claw members are connected to the proximal ends of a first telescoping tube member, operating to pull the distal ends of the claw members into or out of the telescoping tube members so that when the distal end of the telescoping tube members is retracted, the distal ends of the claw members are pulled into the telescoping tube members.

19. The portable apparatus of claim 13, wherein one of the at least one interior spaces is sized to receive a cable having a diameter of up to 75 mm.

20. A portable apparatus for use with a portable computer in measuring the tension of a stressed cable, the apparatus comprising:
   a. two clamps, wherein each clamp comprises two clamping members pivotally joined and capable of being actuated into an open and closed position by a distal actuator, the pivot further comprising a first torsion spring biased to retain the clamping members in a closed position except when the distal actuator is actuated, and the proximal ends of the two clamping members, when in the closed position, defining at least one interior space sized to receive the stressed cable, wherein the distal actuator comprises the distal ends of the clamping members, wherein pulling the distal ends of the clamping members together will actuate the clamping members, and wherein the distal actuator further comprises an extension handle comprising:
     i. two claw members, wherein the proximal ends of the claw members are connected to the distal ends of each of the clamping members; and
     ii. a plurality of telescoping tube members, wherein the distal ends of the claw members are connected to the proximal ends of a first telescoping tube member, operating to pull the distal ends of the claw members into or out of the telescoping tube members so that when the distal end of the telescoping tube members is retracted, the distal ends of the claw members are pulled into the telescoping tube members;
   b. a circuit board connected to the clamps and comprising:
     i. an accelerometer for measuring the transverse acceleration of the stressed cable;
     ii. a converter for receiving the transverse acceleration data of the stressed cable and converting it into an analog signal based on variations in voltage; and
     iii. a circuit that receives the analog signal from the converter and is capable of transmitting said analog signal; and
   c. a portable power source, such as a battery or a photo cell.

\* \* \* \* \*